March 2, 1937. W. A. FORSTER 2,072,326
METER FOR LIQUIDS
Filed Oct. 22, 1934 2 Sheets-Sheet 1

INVENTOR.
W. A. FORSTER
BY Jesse R. Stone
Lester B. Clark
ATTORNEYS

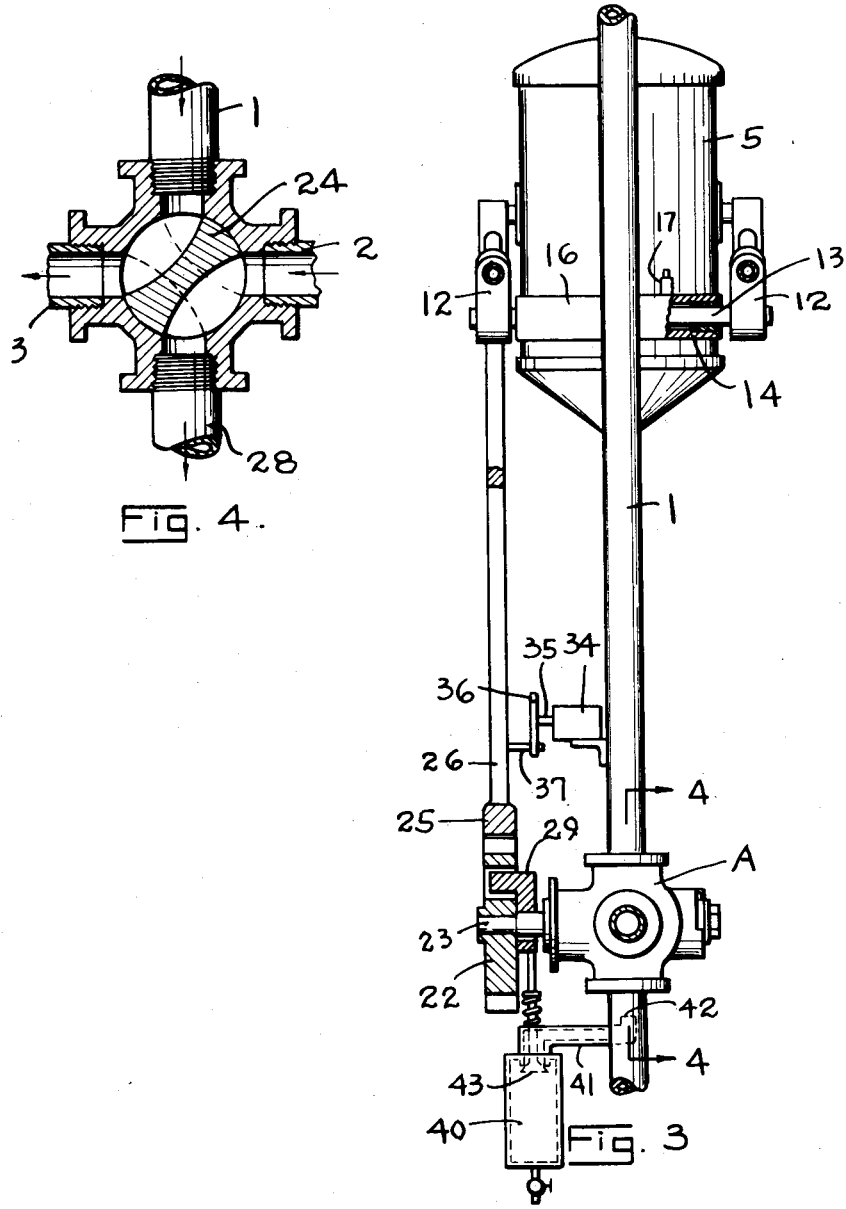

Patented Mar. 2, 1937

2,072,326

UNITED STATES PATENT OFFICE 2,072,326

METER FOR LIQUIDS

William A. Forster, Dallas, Tex.

Application October 22, 1934, Serial No. 749,418

13 Claims. (Cl. 249—26)

My invention relates to meters for measuring the amount of liquid flowing through a line of pipe or issuing from a container.

It is an object of the invention to produce a meter to measure the weight of the liquid, said meter being of a balancing type.

It is a further object to produce a weight meter which is of simple and economical construction and accurate in operation.

Another object of the invention is to produce a type of meter which may be supported entirely upon the liquid conducting line.

Another object of the invention is to produce a weight meter of a balancing type in which the movable counterbalance is entirely enclosed and automatically movable.

Another object of the invention is to provide a weight meter of the balancing type in which the operation of the control valve will be practically instantaneous.

Another object is to provide a beam upon which the containers are supported, said beam also being a housing or container for the counterbalancing material.

It is another object of the invention to provide a weight operated liquid meter in which the control valve is unaffected by the movement of the beam until the said beam has passed a horizontal position.

In the drawings herewith is shown a preferred embodiment of the invention in which Fig. 1 is a front elevation of an apparatus involving my invention.

Fig. 3 is a vertical section taken on the plane 3—3 of Fig. 1.

Fig. 4 is a longitudinal section through the control valve approximately on the plane 4—4 of Fig. 3.

Figure 2:
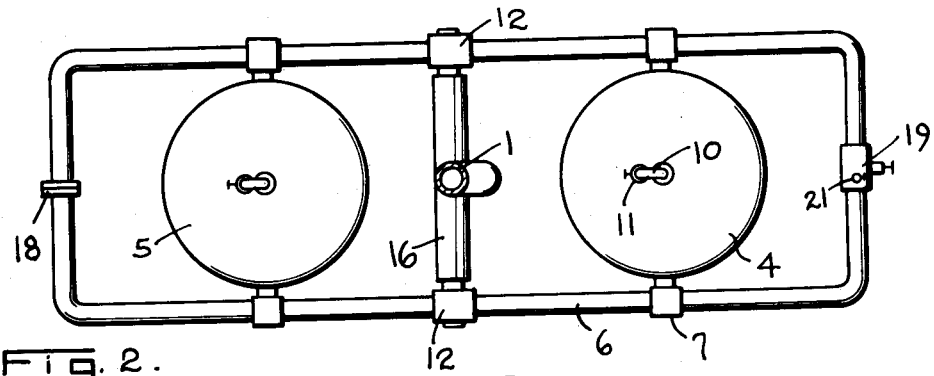
Fig. 2 is a top plan view thereof.

My invention is shown as applied to and supported upon a liquid conducting pipe line 1. The liquid passing through this pipe may be from a tank or container or from pumps or may be flowing from a well under pressure or otherwise. This liquid is measured as to weight by the apparatus shown in the drawings.

The liquid is passed by way of a control valve shown generally at A through pipes 2 and 3 to containers 4 and 5. The pipes 2 and 3 are flexible material such as hose, allowing the movement of the two containers without interfering with the flow of liquid through these connecting pipes. Each container is calibrated to carry a certain predetermined weight of liquid. The containers are mounted upon an approximately rectangular beam or frame 6. The term "beam" as here employed designates a walking beam, serving as a support and pivoted to rock. The connections between the containers and the beam are made through clamps 7 engaged about the outer sides of the beam and connected to trunnions 8 secured upon plates 9 on opposite sides of the containers. This allows the containers to be held by gravity in an upright position as seen in the drawings. The upper end of each container is provided with a vent pipe 10 having an adjustable manually operated valve 11 therein. This allows a vent for gas or air from the container and allows atmospheric pressure to prevail therein, or permits placing the container contents under pressure by closure of the valve if desired.

The beam 6 is shown as of tubular construction. It is made up of a pipe bent into rectangular shape and supported midway of its ends upon yokes or clamps 12, said clamps being in turn supported upon a shaft 13 to which said yokes are clamped. Thus the beam is rigidly secured to the shaft and is capable of rocking with the shaft in the bearing or support 14 shown best in Fig. 3. Said bearing is mounted upon a web or plate 15 secured within a bend in the liquid-conducting pipe, as will be noted best in Fig. 1. Referring again to Fig. 3, the construction of the bearing is shown. I provide a sleeve 16 to support the bearing 14, said sleeve between the bearings providing a space within which lubricant may be introduced through a nipple 17.

The beam 6 is divided into two sections by the blind flange 18 on one end and valve 19 on the other end which separate the beam into separate chambers for the weighting liquid. Valve 21 on top of the beam provides for introducing the weighting liquid and valve 20 on the bottom of the beam provides for bleeding out some of the weighting liquid if necessity arises.

The interior of the beam is formed into two separate chambers within which weighting liquid, such as mercury, is introduced. Although mercury is preferred it is obvious that any type of weight adapted to move from one end of the beam to the other in the operation of the device may be employed. The advantage of mercury is that it is easily movable without appreciable friction and operates rapidly in the use of the device. I contemplate placing a quantity of mercury in the beam almost sufficient to counterbalance the weight of liquid contained by the opposite container when said container is filled. Thus the mercury in the lower end of the arm will balance the weight of the opposing container until the container is filled to the desired or predetermined amount. The container will then have sufficient weight to cause the beam to rock and allow the mercury to flow to the other end of the beam.

Figure 1:
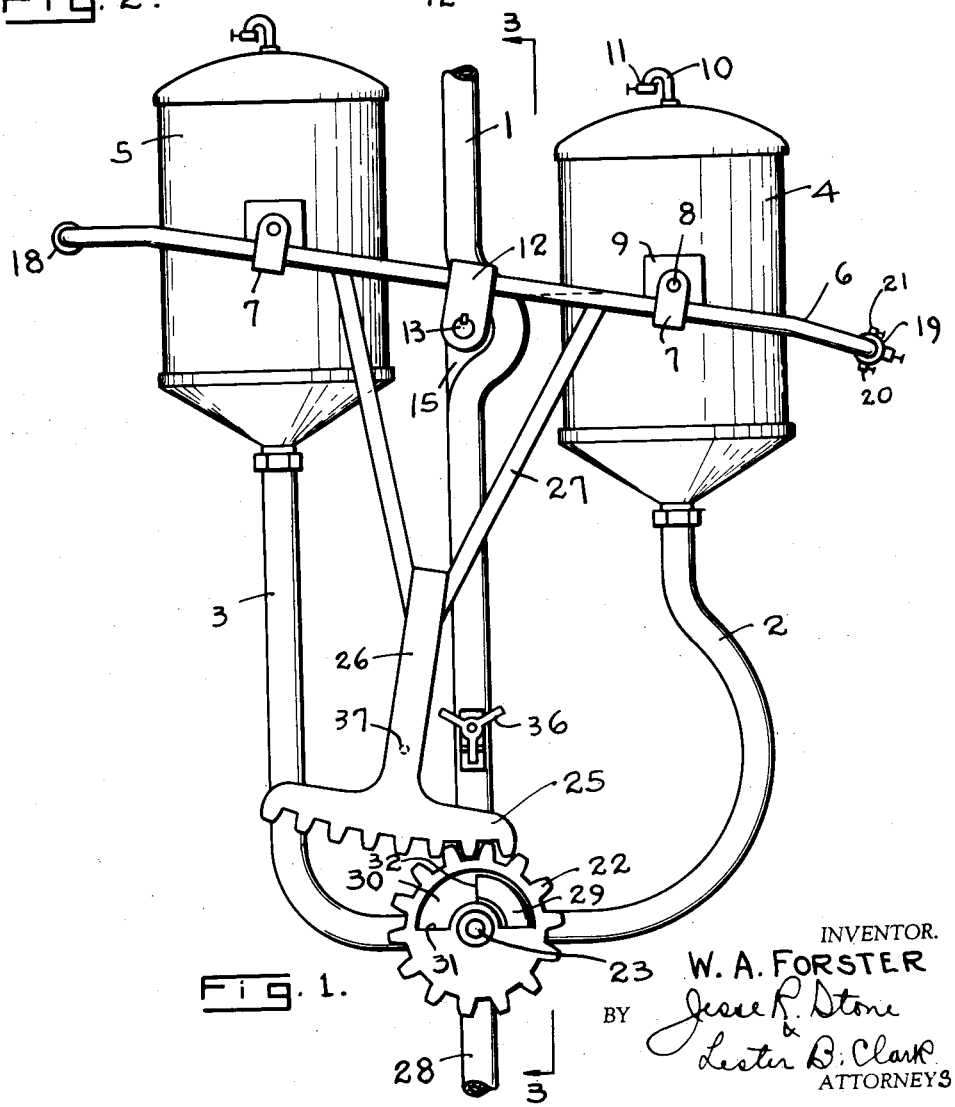

It will be noted that each end of the beam 6 is inclined downwardly for a short distance to provide a reservoir. As seen at the left of Fig. 1, this section becomes approximately horizontal as the beam reaches the end of its oscillation, and it is only then that the counterbalance liquid is all discharged from the upper end of the beam. This abrupt flow of the counterbalancing liquid will operate the valve abruptly without any fluttering as might otherwise result.

This rocking of the beam is employed in controlling the valve A. This is done by forming upon the valve A a gear 22. This gear is secured to the stem 23 upon a plug valve 24 in the valve housing. Said gear is operated by means of a rack 25 mounted at the lower end of the arm 26, said arm being secured by two upwardly inclined branches 27 thereon to the beam 6. It will thus be seen from Fig. 1 that the rocking of the beam will move the rack 25 to engage the pinion gear 22 and cause it to rotate through approximately 180°.

The valve 24 shown in Fig. 4 is mounted to control the passage of the liquid from the pipe 1 to one or the other of the containers. Thus with reference to Fig. 4, the liquid from the pipe 1 is shown as being directed to the pipe 3, while the liquid from the pipe 2 is passing outwardly on the other side of the valve to the outlet pipe 28. It is possible to provide a free outlet through the pipe 28 so that the liquid from the container which is emptying will be completely discharged before the liquid entering through the pipe 1 has filled the opposing container to the desired or predetermined amount. In this way there will be no liquid left in the container when the valve is changed in position.

When the liquid has been discharged from one container and has filled the opposite container to the desired or predetermined amount the weight of the filled container will be sufficient to raise the weighted end of the beam and operate the valve to move it into the dotted line position shown in Fig. 4 and reverse the direction of flow from the containers. It will be obvious that it is desirable to have the valve move quickly from one position to the other to avoid any fluttering of the valve. When the beam assumes a horizontal position in changing from one inclined position to the other I arrange to move the valve only after the beam has passed the horizontal position. This is done by arranging a segmental projection 29 upon the valve stem, said projection extending into a semi-circular slot 30 in the gear 22.

The gear is loosely mounted upon the shaft while the segmental arm 29 is keyed thereto. Thus the rotation of the gear from the position shown in Fig. 1 will not move the arm 29 until the shoulder 31 at the end of the slot 30 engages the shoulder 32 on the arm 29. Thus the gear will move through 90° before the valve is actuated. The gear will then move through a further 90° throwing the valve into the reverse position. This causes an abrupt and rapid movement of the valve at the time the change is made. It is to be understood that the valve is moved only through 90° in the usual manner. The provision for this movement is seen in Fig. 3 at the right of the valve.

In order to keep a record of the amount of liquid passing through the device I provide a counter or indicator of any desirable type shown at 34. This counter is shown mounted upon a bracket on the pipe 1 and extending in the direction toward the arm 26. On the shaft 35 of the counting device are a plurality of radial fingers 36. To engage one of these fingers and move the counter I provide a pin 37 upon the arm 26 extending inwardly a sufficient distance to contact with and move one finger 36 through a sufficient distance at each swinging of the arm to actuate the counter.

In Fig. 3, connected to the main pipe and immediately below the valve A is seen the drip or sampler which includes the chamber 40 which is connected to the pipe by means of the tube 41, whose upturned end 42, within the main discharge pipe, intercepts the fluid leaving the meter. The stem of the spring closed valve 43 engages a cam surface on the hub of the arm 29 so that the valve is opened slightly for each operation of the main valve A. In this manner a small sample of liquid is taken periodically and the sample obtained is representative of and proportional to the quantity of liquid metered.

It will thus be seen that I have provided a meter which is positive and accurate in its operation and which cannot easily get out of order or fail to function. The valve is moved automatically by the emptying of one container and the filling of the other to change quickly from one position to the reverse position. Thus there is no likelihood of leakage of fluid through the valve without its being properly weighed and measured. The device is capable of ready adjustment in case of necessity and is simple and economical in construction. The advantages of the device will be obvious to those skilled in the art.

What is claimed as new is:

1. A liquid conducting line, a beam pivoted to rock upon a fulcrum, a pair of containers of equal capacity pivotally supported from the beam at points between the fulcrum and the ends of said beam and free to maintain a constant vertical position, connections between said line and each of said containers, a valve in said line controlling the flow to and from said containers, and means responsive to the movement of said beam to actuate said valve.

2. A liquid conducting line, a beam, a pivoted support for said beam, a pair of separate unconnected containers of equal capacity pivotally supported on said beam between the ends thereof and adapted to maintain a vertical position, connections between said line and said containers, independently of said beam, a valve in said line controlling the flow of fluid from said line to and from said containers, a counterbalancing weight movable from one end of said beam to the other and to cause the rocking of said beam, and means responsive to the movement of said beam to actuate said valve.

3. A weighing meter for liquids including a fluid conducting line, a valve therein, a walking beam, a pair of containers between the opposite ends of said beam, means connecting said valve and said containers independently of said beam, said valve being adapted to be moved simultaneously to direct liquid in said line to either one of said containers and from the other container back to said line, said containers being supported to pivot in the plane of the beam, a bearing upon which said beam is rockable, means connected with said beam to move said valve, and means associated with said beam to move by gravity to one end of said beam beyond the container and to nearly counterbalance the weight of liquid in the container on the other end of said beam.

4. A weighing meter for liquids including a fluid conducting line, a hollow beam mounted to rock thereon, a container adjacent each end of said beam, connecting pipes between said containers and said line, a valve controlling the passage of liquid alternately from said line to one of said containers and from the other of said containers back to said line, means in the interior of said beam to delay the rocking of said beam until one container is full of liquid and means on said beam to actuate said valve, said valve actuating means acting only when said beam has tilted from one inclined position to a position past the horizontal in the opposite direction.

5. In a weighing meter for liquids, a liquid conducting line, a rockably mounted beam associated therewith, containers of equal capacity pivotally mounted at points intermediate the ends of said beam, flexible connections between said line and said containers, a valve in said line and movable to discharge liquid from said line to one or the other of said containers and to empty liquid from the one not being filled, means actuated by said beam to move said valve, and a counterbalance freely movable from one end to the other of said beam whereby said counterbalance may lie beyond said containers from said line.

6. In a weighing meter for liquids, a liquid conducting line, a rockably mounted beam associated therewith, containers of equal capacity flexibly mounted at intermediate points of said beam, to balance said beam, flexible connections between said line and said containers, a valve in said line and movable to discharge liquid from said line to one or the other of said containers and to empty liquid from the one not being filled, means actuated by said beam to move said valve, and a liquid weight in said beam adapted to flow from end to end thereof, said weight being slightly less in value than the weight of the liquid filling one of said containers.

7. A hollow rocking beam, a pair of balanced containers pivotally connected thereto at points intermediate the ends thereof, means to discharge liquid to one of said containers and empty liquid from the other container, and a freely movable weight in the interior of said beam, said weight normally lying at one end of said beam beyond the adjacent container and acting to almost balance the liquid filling one of said containers.

8. A hollow rocking beam, a pair of balanced containers pivotally connected thereto at points intermediate the ends thereof, means to discharge liquid to one of said containers and empty liquid from the other container, a freely movable weight in the interior of said beam, said weight normally lying at one end of said beam beyond the adjacent container and acting to almost balance the liquid filling one of said containers, and means to reverse the direction of flow to or from said containers actuated automatically by the rocking of said beam.

9. A hollow rocking beam, a pair of balanced containers pivotally connected thereto at points intermediate the ends thereof, means to discharge liquid to one of said containers and empty liquid from the other container, a freely movable weight in the interior of said beam, said weight normally lying at one end of said beam beyond the adjacent container and acting to almost balance the liquid filling one of said containers, and means to reverse the direction of flow to or from said containers acting abruptly when said beam has rocked past the horizontal position.

10. In a weighing meter for liquids, a liquid conducting line, a beam pivotally supported upon a fulcrum adjacent said line, said beam including a plurality of tubular members connected at their ends, liquid containers between said members and pivotally supported thereon, fluid connections between each of said containers and said line, a valve in said line controlling flow of liquid to and from said containers, and a liquid weight in each of said members.

11. In a weighing meter for liquids, a liquid conducting line, a beam pivotally supported upon a fulcrum adjacent said line, said beam including a plurality of tubular members connected at their ends, liquid containers between said members and pivotally supported thereon, fluid connections between each of said containers and said line, a valve in said line controlling flow of liquid to and from said containers, and a liquid weight in each of said members, each of said members including a tube having a central straight portion and an end portion bent outwardly and downwardly relative to said straight portion.

12. In a weighing meter for liquids, a liquid conducting line, a walking beam including a plurality of tubular members connected at their ends, but having separate chambers therein, means to open connection between said chambers when desired, a weighting liquid in each of said chambers, a liquid container on each end of said beam, valve-controlled connections between said line and said containers, the ends of said chambers being bent downwardly at an angle to the remainder of said beam.

13. In a weighing meter for liquids, a liquid conducting line, a walking beam including a plurality of tubular members connected at their ends, but having separate chambers therein, means to open connection between said chambers when desired, a weighting liquid in each of said chambers, a liquid container on each end of said beam, pipes connecting said line and said containers, a valve operated by said beam and controlling the flow of liquid between said line and said containers, said valve operating only when said beam has rocked past a horizontal position.

WILLIAM A. FORSTER.